(12) United States Patent  
Liu

(10) Patent No.: US 8,009,691 B2
(45) Date of Patent: Aug. 30, 2011

(54) METHOD FOR TRANSMITTING/RESPONDING PAGING INFORMATION FOR DUAL-MODE ACCESS TERMINAL AND DEVICE AND METHOD FOR NETWORK SWITCHING ACCORDING TO NETWORK INDICATION

(75) Inventor: Weimin Liu, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 464 days.

(21) Appl. No.: 12/067,857

(22) PCT Filed: Sep. 22, 2006

(86) PCT No.: PCT/KR2006/003780
§ 371 (c)(1),
(2), (4) Date: Sep. 2, 2008

(87) PCT Pub. No.: WO2007/035061
PCT Pub. Date: Mar. 29, 2007

(65) Prior Publication Data
US 2009/0022108 A1    Jan. 22, 2009

(30) Foreign Application Priority Data

Sep. 22, 2005   (CN) .......................... 2005 1 0086494
Sep. 22, 2005   (CN) .......................... 2005 1 0086495

(51) Int. Cl.
*H04L 12/66* (2006.01)
(52) U.S. Cl. ...................................................... 370/463

(58) Field of Classification Search .................. 370/463, 370/229, 230, 254, 351, 389, 422, 431, 437, 370/449, 462; 398/43, 77, 78; 455/73, 130, 455/150.1, 179.1, 185.1, 186.1, 186.2, 550.1, 455/557, 560
See application file for complete search history.

(56) References Cited

U.S. PATENT DOCUMENTS
5,369,681 A    11/1994   Boudreau et al.
(Continued)

FOREIGN PATENT DOCUMENTS
CN    1571322 A    1/2005
(Continued)

OTHER PUBLICATIONS
Int'l Search Report (PCT/ISA/210) (3 pp), Jan. 10, 2007.
(Continued)

*Primary Examiner* — Derrick Ferris
*Assistant Examiner* — Omar Ghowrwal
(74) *Attorney, Agent, or Firm* — The Farrell Law Firm, P.C.

(57) ABSTRACT

Provided is a method for transmitting 1x paging information through an HRPD network and responding to the 1x paging information by a dual-mode MS/AT. After the MS/AT turns to an HRPD network and informs an MSC of related information, if some 1x paging information arrives, the MSC sends a message indicating 1x service arrival to the PCF. An HRPD AN bears the 1x service arrival message that carries calling information sent from the PCF in the 1x service packet to send to the MS/AT. If the user, receiving the 1x service arrival message, chooses to accept a 1x call, the MS/AT terminates the service in the HRPD network and turns to the 1x network to send a "paging response" message to a 1x BS.

12 Claims, 8 Drawing Sheets

U.S. PATENT DOCUMENTS

| | | | |
|---|---|---|---|
| 5,701,337 A * | 12/1997 | Silver et al. | 455/426.1 |
| 6,085,110 A * | 7/2000 | Nilsson | 455/552.1 |
| 2001/0014599 A1 * | 8/2001 | Henderson | 455/412 |
| 2003/0157945 A1 * | 8/2003 | Chen et al. | 455/458 |
| 2005/0188113 A1 * | 8/2005 | Lee et al. | 709/249 |
| 2005/0227631 A1 * | 10/2005 | Robinett | 455/83 |
| 2006/0154664 A1 | 7/2006 | Hidaka | |
| 2007/0047562 A1 * | 3/2007 | Sayeedi et al. | 370/401 |

FOREIGN PATENT DOCUMENTS

| | | |
|---|---|---|
| JP | 7-500232 | 1/1995 |
| JP | 10-13331 | 1/1998 |
| JP | 11-225165 | 8/1999 |
| JP | 2002-064867 | 2/2002 |
| JP | 2002-281556 | 9/2002 |
| JP | 2004-193853 | 7/2004 |
| WO | WO 01/10080 | 2/2001 |
| WO | WO 2005/020620 | 3/2005 |
| WO | WO 2005/022939 | 3/2005 |
| WO | WO 2005/125110 | 12/2005 |

OTHER PUBLICATIONS

Written Opinion of Int'l Search Authority (PCT/ISA/237) (3 pp), Jan. 10, 2007.

* cited by examiner

METHOD FOR TRANSMITTING/RESPONDING PAGING INFORMATION FOR DUAL-MODE ACCESS TERMINAL AND DEVICE AND METHOD FOR NETWORK SWITCHING ACCORDING TO NETWORK INDICATION

BACKGROUND OF THE INVENTION

1. Field of the Invention

The present invention relates to a method for transmitting Code Division Multiple Access 2000 1x (hereinafter referred to as CDMA2000 1x) paging information through a HRPD network and responding to the 1x paging information by a corresponding 1x/HRPD dual-mode Access Terminal (hereinafter referred to as MS/AT) when a Session Control/Mobility Management (hereinafter referred to as SC/MM) module is in a Packet Control Function (hereinafter referred to as PCF) module in a High Rate Packet Data (hereinafter referred to as HRPD) network.

Furthermore, the present invention relates to a mobile station, especially to a mobile station which switches between a HRPD network and a CDMA2000 1x network according to network indication and a method thereof.

2. Description of the Related Art

The CDMA2000 1x network is a mobile network that provides users with voice service as well as middle and low rate data service. The HRPD network is a mobile network that provides users with high rate data service. In most cases of practice, the HRPD network is brought into service in cooperation with CDMA2000 1x network, i.e., the CDMA2000 1x system and the HRPD system offer overlapped mobile communication service. A user adopts a MS/AT to access the HRPD network and the CDMA2000 1x network. However, because of interference or any other technical problem, the MS/AT can not access the two networks simultaneously. Thus, specific mechanism is necessary for MS/AT to switch between the two networks.

In earlier stage of the application, the cdma2000 1x network is logically independent with the HRPD network, and no information exchange is supported in the network side of the two networks. However with the development of information on call control and mobility management can be transferred between the two networks. For instance, in the case that the 3GPP2 A.S0007-A based network structure is adopted in the HRPD network, i.e., the SC/MM module is in PCF, the dedicated interface A1p is established between the CDMA2000 1x network's Mobile Switch Center (hereinafter referred to as MSC) and the HRPD network's PCF to bear the information on call control and the mobility management information between MSC and the HRPD Access Network (hereinafter referred to as AN). The reference model of HRPD inter-working structure with well established A1p interface is shown in FIG. 1. In 3GPP2, the network structure will be described in specification A.S0009, which is the upgrade version of specification A.S0007-A. In this case, a dedicated logic inter-working module IWS, which is adopted to perform the switching between the message in the A1p interface and the 3G1x service message in the air-interface, should be set in the PCF or the AN. This scheme is called cross-paging in 3GPP2. With cross-paging, when a user moves in an HRPD network and informs the MSC of the related information via A1p interface, the MSC transmits this message in virtue of the cross-paging mechanism if some 1x paging message reaches the MSC as shown in FIG. 2.

With the current technology, a user in HRPD network can not make a choice to the received 1x paging. Only when he/she interrupts the current HRPD service, turns to the 1x network and continues the subsequent call flow, i.e., after a transmission channel is well established and an alerting message is received from network, the user can find a call number displayed by the MS/AT and further decide whether to accept the call or not. In this case, if the user rejects to accept the call, following problems will be caused:

1. waste of 1x network resources;

Only when the MS/AT turns to the 1x network and establishes the air link, the calling number and the calling name can be seen. In this case, if the user rejects to accept the call, it is nonsense of the resource allocated by 1x network for this call.

2. cause interruption to HRPD service, and therefore cause upset to users.

Only when the MS/AT interrupts the current HRPD service first and turns to the 3G1X network, the calling number can be seen. In this case, if the user rejects to accept the call, it is nonsense of the HRPD service's interruption for this call.

Through the connection link between the two networks, the paging information through one network may be transmitted to the dual-mode MS/AT through the other network.

The following network switching mechanism is adopted by most MS/AT in current commercial networks: in idle or non-realtime service state, the MS/AT switches between the 1x network and the HRPD network alternatively according to a time slot to receive and transmit necessary control information, refresh configuration parameters and listen to a paging from the two networks. When initiating a call, the dual-mode MS/AT accesses the corresponding network according to the type of service selected by the user.

At present, since it is necessary for the dual-mode MS/AT to switch between the two networks frequently in practice, following problems are caused:

1. MS/AT's stand-by time is shorter

Power consumption is increased because the MS/AT must switch between the two networks frequently and intercept information from the two networks.

2. Affection to service performance

For instance, when the MS/AT is handling the non-realtime service in the HRPD network, the operational service will be affected since it is necessary for the MS/AT to regularly intercept information from the 1x network.

3. Missing of the paging information

Because of service dealing in one network, paging information from the other network may be missed. For example, when the dual-mode MS/AT (available at present) is handling the voice service in the 1x network, it does not intercept any information from the HRPD network. Therefore, the paging from the HRPD network may be missed.

To solve the problems mentioned above, the technology in the network side is proposed to make it possible that the paging information from one network could be transmitted through the other network. In present invention, the paging information of another network from the network to MS/AT is defined as one of the network-to-MS/AT indications. Other kinds of network indications may be the control information sent from the network to MS/AT according to specific conditions to request the MS/AT to switch into that another network.

By far, no method or technique is put forward for the MS/AT in performing parallel process to network indications and in performing parallel switching after the MS/AT receives the network indications.

SUMMARY OF THE INVENTION

Therefore, an object of the present invention is to provide a method for transmitting 1x paging information through the HRPD network and responding 1x paging information by a MS/AT.

Further, an another object of the present invention is to provide a method for performing parallel process to network indications and switching after a MS/AT receives the network indications is proposed, and a dual-mode MS/AT using the same.

To achieve the object mentioned above, there is proposed a method for transmitting 1x paging information through a HRPD network and responding to the 1x paging information by a dual-mode MS/AT comprising steps of:

a) after the MS/AT turns to a HRPD network and informs a MSC of related information via a interface between a PCF and the MSC, if some 1x paging information arrives, the MSC sending a message to notice PCF 1x service arrival, the message including calling information;

b) the PCF sending corresponding message indicates the arrival of 1x service to HRPD AN according to the message from the MSC;

c) a HRPD AN bearing a 1x service arrival message that carries the calling information sent from the PCF in the 3G1X service packet to send to the MS/AT;

d) after the MS/AT in the HRPD network receives the 1x service arrival message, the MS/AT displaying the calling information included in the message to the user; and e) if the user chooses to accept a 1x call, the MS/AT terminating the service in the HRPD network and switching into the 1x network to send a "paging response" message to a 1x BS.

With the method in the present invention, the MSC transmits the 1x service arrival information including the calling information to the MS/AT through the HRPD network so that the user can evaluate the importance of the 1x call and further decide whether to switch into the 1x network to accept the call or not before interrupting current HRPD service. In this way, both the current HRPD service's interruption resulted from an unimportant 1x call and the consequent unnecessary occupation of 1x network resource can be avoided. With the method in the present invention, if the user rejects to accept the call, the MS/AT may transmit the user rejection information to the MSC through HRPD network by specific message so as to avoid subsequent unnecessary operations for the MSC.

To achieve the another object mentioned above, there is proposed a device for switching between two networks according to network indications comprising:

a control module which is adapted to control relevant modules in a MS/AT, and switch operation between a CDMA2000 modem and a HRPD modem;

a CDMA2000 modem which is adapted to perform encoding and decoding of service data, encoding and decoding of signaling, spectrum spreading and de-spreading of physical channel, and modulating and demodulating;

a HRPD modem which is adapted to perform encoding and decoding of service data, encoding and decoding of signaling, spectrum spreading and de-spreading of physical channel, and modulating and demodulating;

a memory which is adapted to save data necessary for normal operation of the MS/AT;

a switching unit which is adapted to connect a radio module with the CDMA2000 modem or the HRPD modem respectively under control of a signal from the control module; and a radio module which is adapted to connect with the modems through the switching unit, perform conversion between baseband digital signals and RF analog signals and receive and transmit the RF analog signals through an antenna.

To achieve the another object mentioned above, there is proposed a method for switching between two network according to network indications comprising steps of:

after receive an another network switching indication through a current access network, a dual-mode MS/AT analyzing the indication and displaying relevant information to a user;

if the user depress key "accept", a control module responding ACK information to the current network; and if the user depress key "reject", the control module responding rejection information to the current network.

In the present invention, a dual-mode MS/AT capable of switching between networks according to network indications and user's commands is proposed. With such MS/AT, the problems resulted from the old dual-mode MS/AT's frequent switching and intercepting between networks and the consequent problems are well solved.

DETAILED DESCRIPTION OF THE PREFERRED EMBODIMENTS

Figure 1:
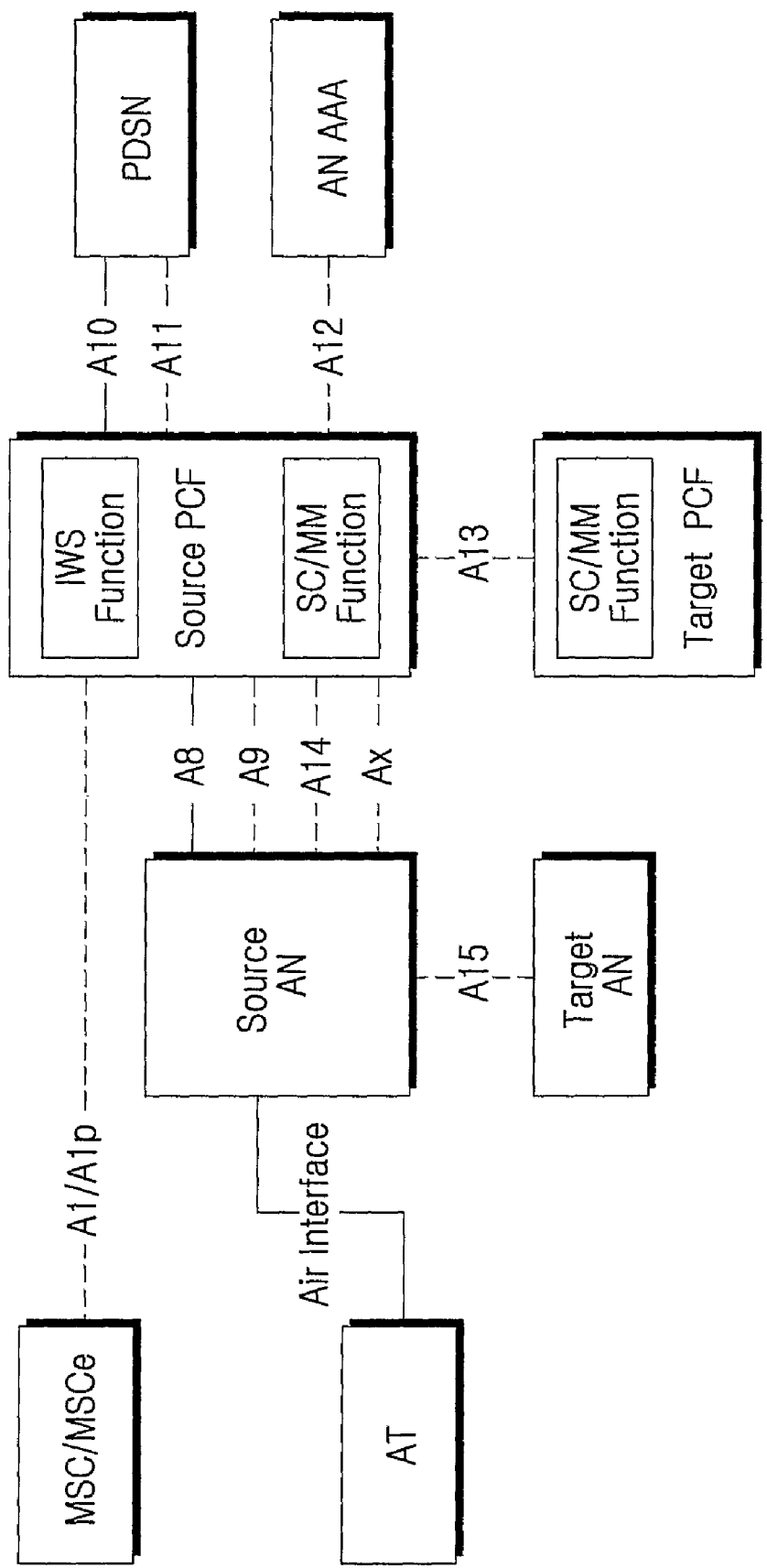
FIG. 1 shows the reference model (the SC/MM function is performed in PCF) of the HRPD inter-working structure in the case that the A1p interface is well established.
Figure 2:
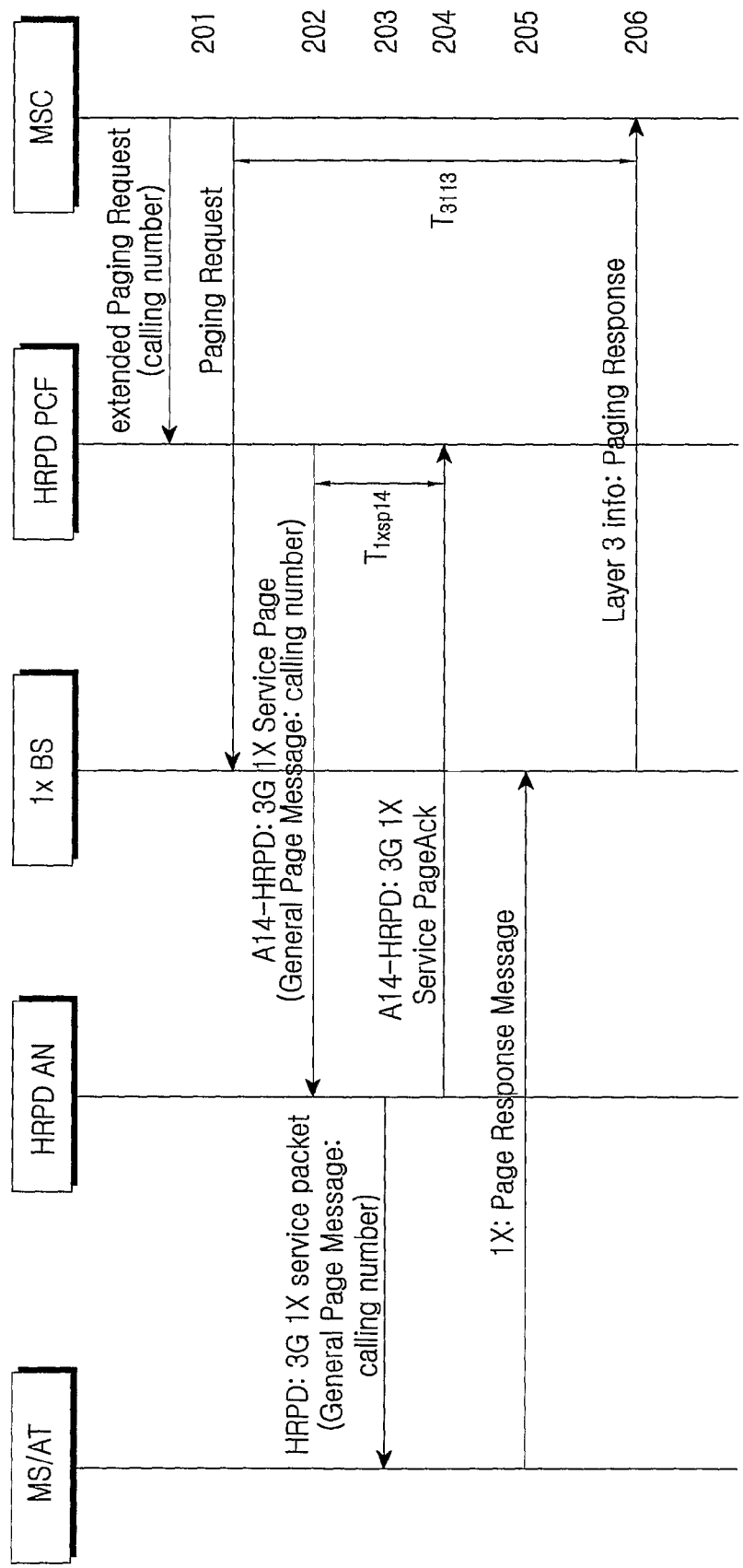
FIG. 2 illustrates a conventional operation flow that the 1x paging information is transmitted through the HRPD network and that the corresponding dual-mode MS/AT responds to the 1x paging information.

The present invention mainly includes the method for transmitting a 1x paging through the HRPD network and the two cases that MS/AT should process when it receives the 1x paging in the HRPD network: the user decides to accept the 1x call and the user rejects to accept the 1x call. In subsequent section 1 and section 2, the method for transmitting 1x call arrival information and the mentioned two cases needed to process are described respectively.

According to related specification in 3GPP2, if the MSC receives no paging response message from the MS/AT before clock T3113 is timeout, it re-transmits the paging message. The period spent in that the user decides whether to accept the call or not may be long. Thus, in order to avoid unnecessary re-transmission of paging message from the MSC, two processing approaches may be applied here. One is to make the clock T3113 longer, i.e., make clock T3113 not stop until the MSC receives the paging response message through the 1x network or receives the rejection message through the HRPD network. If clock T3113 is timeout, but the MSC does not yet receive any paging response message from the MS/AT through the 1x network or any rejection message through the HRPD network, it will re-transmit the 1x service arrival message till the preset re-transmission times are met. In approach 1, the MS/AT does not respond an ACK message to the AN after receiving the 1x service arrival message from the AN. The second approach is to divide clock T3113 into two clocks $T_1$ and $T_2$, which both start at the time that MSC is transmitting the 1x call arrival message. The MS/AT in the HRPD network responds an ACK message to the AN after it receiving the 1x service arrival message. The AN forwards this ACK message to the PCF, and then the PCF forwards it to the MSC. $T_1$ stops when the MSC receives the 1x call response message from the MS/AT through the HRPD network. If clock $T_1$ is timeout, but the MSC does not yet receive any 1x call response message from the MS/AT, it will re-transmit the 1x call arrival message till the preset re-transmission times are met. $T_2$ stops when the MSC receives the paging response message through the 1x network or the rejection message through the HRPD network. If clock $T_2$ is timeout, but the MSC does not yet receive any paging response message from the MS/AT through the 1x network or any rejection message through the HRPD network, it will terminates this 1x call. In approach 2, the MSC may start clock $T_2$ after clock $T_1$ stops. In following description, approach 2 is taken as an example. The first approach is similar to the second except that: in the first approach, there is no operation flow that the MS/AT responds a "1x service message has been correctly received" message to the MSC through the HRPD network.

1. The User Decides to Accept the 1x Call

Figure 3:
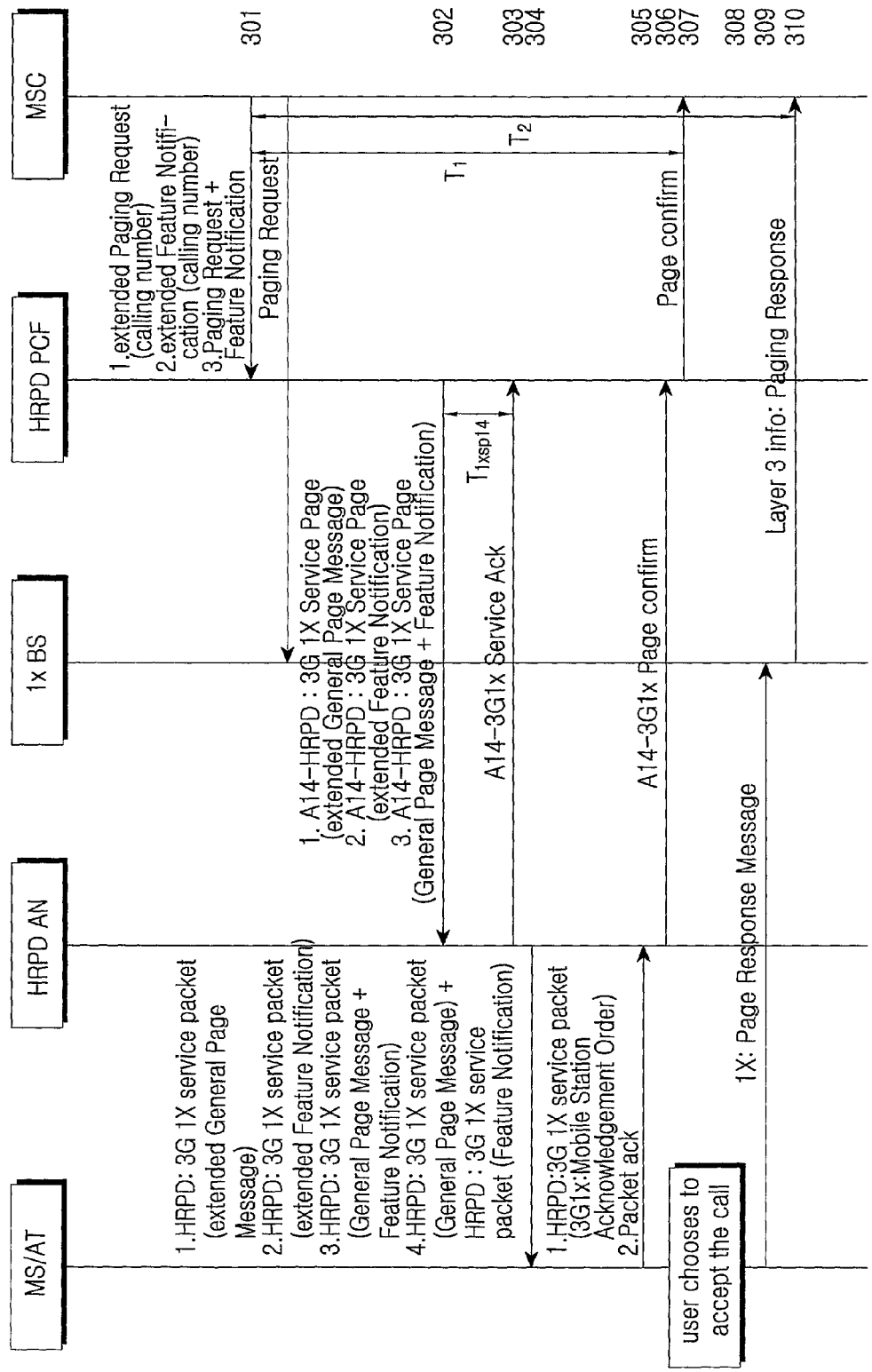
FIG. 3 illustrates an operation flow that the user chooses to accept 1x call according to an embodiment of present invention.

FIG. 3 illustrates an operation flow that the user chooses to accept 1x call according to an embodiment of present invention.

Referring FIG. 3, the steps are as follows:

301) When the MSC receives a call determines the MS/AT within its service region, it sends the 1x call arrival message to the HRPD PCF, the message including calling information such as the calling number, the calling name and so on. Several methods may be applied in expressing the 1x call arrival message. For instance, a) extending the paging request message to add the calling information elements like the calling number element, the calling name element, etc.; b) extending a feature notification message to add the service option elements; c) transmitting the paging request message and the feature notification message in combination. In addition, this function may be realized by extending any other message or by combining other messages on condition that the extended message or message combination may bear information in the paging request message and the calling information.

In the meantime, the MSC sends a "paging request" message to one or more service 1x BS that the called MS/AT can reach. This "paging request" message may contain a Virtual Paging Indicator (VPI) to inform the 1x BS not to send a "general paging" message to the called MS/AT via the air-interface. Meanwhile, the MSC starts clock $T_1$ and $T_2$ for this paging request message.

302) The HRPD PCF sends an "A14-3G1x service" message to the HRPD AN. The content this message bears is constructed according to the message that the PCF receives from the MSC. For instance, the PCF may construct the general paging message as the content that the "A14-3G1x service" message bears according to the message received from the MSC. In this general paging message, the calling information elements are added correspondingly. The PCF may also construct the extended service message as the content that the "A14-3G1x service" message bears according to the message received from the MSC. If what the PCF received is the combination of paging request message and the feature notification message, the PCF may also construct the general paging message as the content that the "A14-3G1x service" message bears according to paging request message, and make the feature notification message as the content that another "A14-3G1x service" message bears, or bear both the general paging message and the feature notification message in the same "A14-3G1x service" message.

While the PCF is transmitting the "A14-3G1x service" message, the PCF starts the clocks such as $T_{1xsp14}$, which stops after the PCF receives the "A14 3G 1X service response" message.

303) The HRPD AN sends a corresponding service response message (e.g., the A14-3G1x service response message) to the PCF after it receives the message from the PCF. Having received the response message, the PCF stops clock $T_{1xsp14}$.

304) The HRPD AN sends the HRPD 3G1X service packet to the MS/AT. The content carried in the A14-3G1x service message received from the PCF by the AN is used as the content that will be carried in the HRPD 3G1X service packet.

305) Having received the message that is sent from the AN in step 304, the MS/AT responds an ACK message to the AN, such as the packet ACK message or the 3G1x MS/AT ACK Order and so on.

306) The AN sends a corresponding ACK message to the PCF.

307) The PCF sends an ACK message (e.g., the feature notification ACK message) to the MSC indicating that the MS/AT has already received the 1x service arrival message through the HRPD network. The MSC stops clock $T_1$ after receiving the ACK message.

308) The user decides to accept the 1x call.

309) The MS/AT turns to the 1x system and sends the paging response message via the 1x network's access channel as the acknowledgement.

310) The 1x BS constructs the paging response message and includes it in the complete layer 3 information message, then sends to the MSC. The MSC stops the clock $T_2$. The subsequent flow is performed according to related specification in 3GPP2.

In step 303 and 304 above, no sequential relationship exists between the two steps.

The operation flow that user chooses to accept 1x call is illustrated in FIG. 3.

For convenience of operation, the user may omit the step of depressing the "response" key in subsequent steps, replacing with the auto-operation of the MS/AT.

2. The User Rejects to Accept 1x Call

Figure 4:
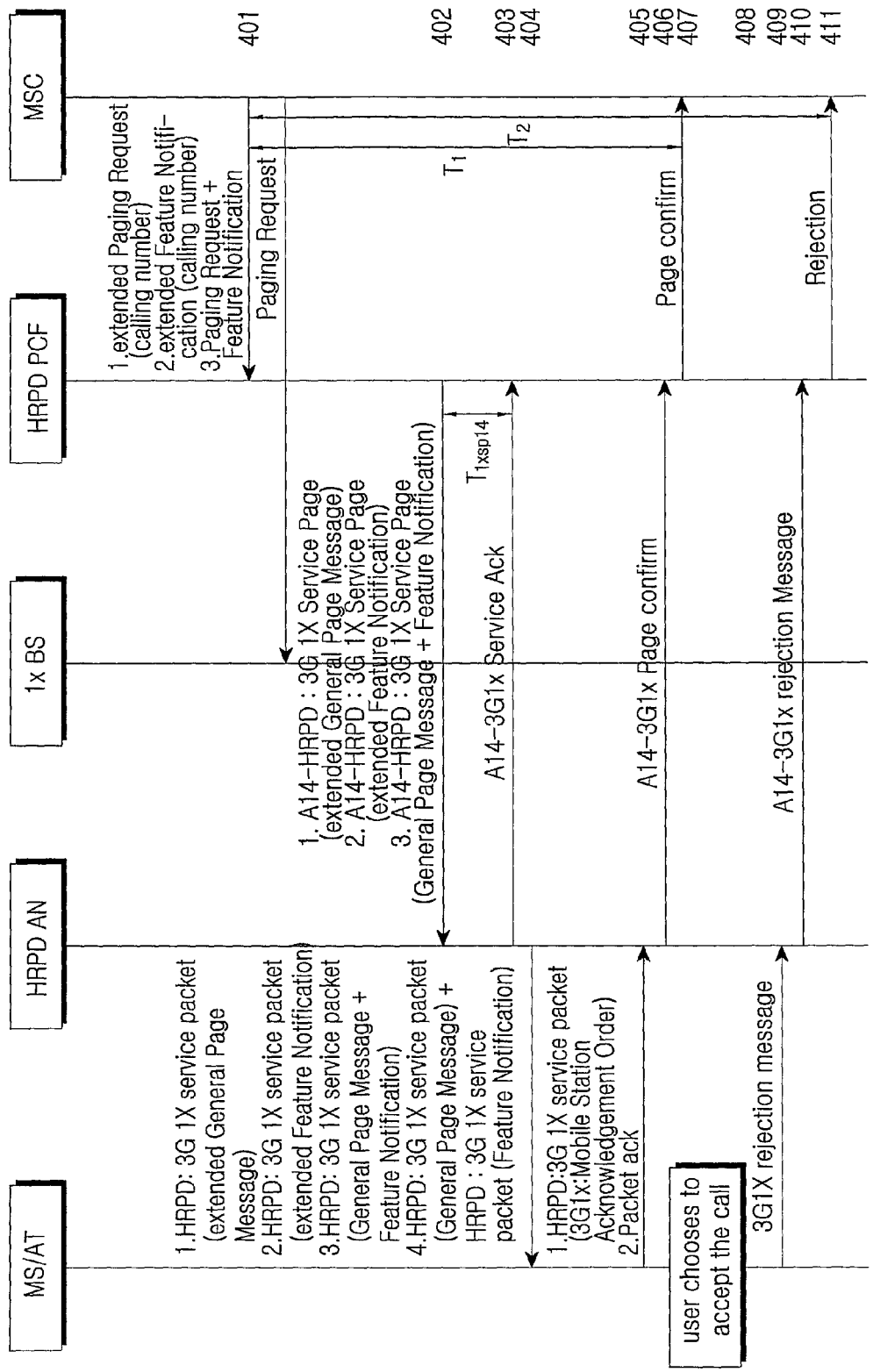
FIG. 4 illustrates an operation flow that the user rejects to accept 1x call according to an embodiment of present invention.

FIG. 4 illustrates an operation flow that the user rejects to accept 1x call according to an embodiment of present invention. Referring FIG. 4, this case includes following steps:

Step 401 through 407 is the same as step 301 through 307 in section 1.

408) The user rejects to accept the 1x call. 409) The called MS/AT sends the response message (e.g., 3G1x: Mobile Station Rejection Order) to the HRPD AN, indicating that the user rejects to accept the call. 410) The AN constructs a corresponding rejection order and sends to the PCF. 411) The PCF constructs a corresponding rejection order and sends to the MSC. Having received this message, the MSC stops clock T2. Then, the MSC terminates the 1x call according to 3GPP2 relevant operation flow.

The operation flow that a user rejects to accept the 1x call is illustrated in FIG. 4. 3. Regarding to the choice of user Two kinds of choices are offered for a user in the HRPD network to decide whether to accept the 1x call or not. One is that a user makes a choice each time. When the MS/AT in the HRPD network receives the 1x paging information, it should remind the user to make a choice and display the calling number. The user may make a choice through the man-machine interface. If the user rejects to accept the call, the prompt signal disappears but no interruption is caused to the HRPD service. The other is to preset in advance. The user may set the MS/AT to reject or accept 1x call in advance. The settings may be done for all calls or some specific number. When a 1x call arrives, the MS/AT operates according to user's preset.

With reference to FIG. 5 to FIG. 9 below, a description will now be made of the details of the present invention to achieve a CDMA2000/HRPD dual-mode MS/AT with the characteristics capable of receiving and analyzing indications through the current network, and switching between networks according to the MS/AT's current state and user's commands.

To make the subject matter more clear, detailed descriptions on known functions and structure will be omitted.

In order to support the dual-mode MS/AT which can switch between networks according network indications, the MS/AT's current state and user's commands, the parts contained in the dual-mode MS/AT.

Figure 5:
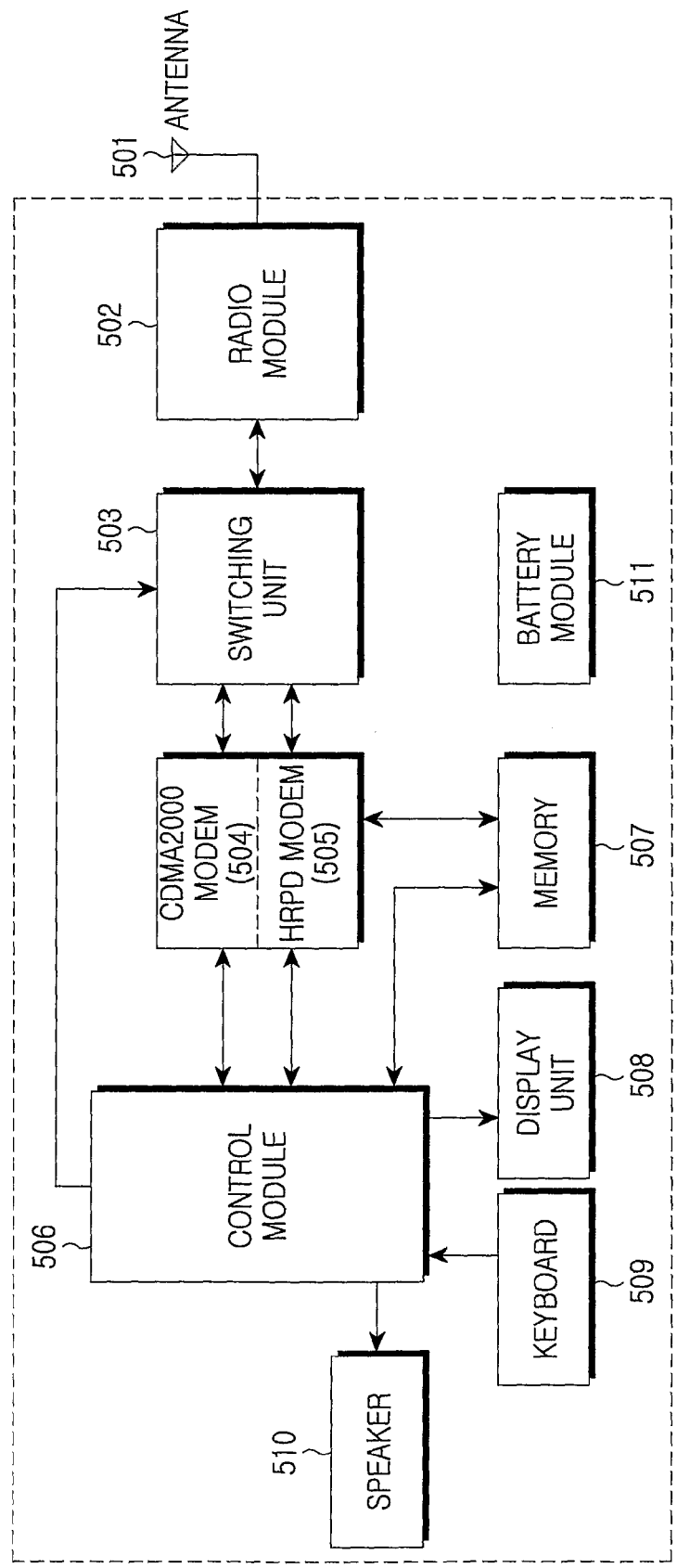
FIG. 5 shows a structure block diagram of a dual-mode MS/AT according to an embodiment of present invention.

FIG. 5 shows a structure block diagram of a dual-mode MS/AT according to an embodiment of present invention.

As shown in FIG. 5, the basic functions as following:

Antenna 501

Antenna is used for receiving and transmitting radio signals. This antenna is designed to be sensitive to all frequencies applied in the CDMA2000 network and the HRPD network.

Radio module 502

Radio module is used for the conversion between the baseband digital signals and the RF analog signals, the receipt and transmission of the RF analog signals, and so on. The radio module connects with the modem through the switching unit 503.

Switching unit 503

Switching unit is under the control of the signals from the control module 506 and used for connecting the radio module with the CDMA2000 modem 504 or the HRPD modem 505 respectively.

CDMA2000 modem 504

CDMA2000 modem is used for encoding and decoding the CDMA2000 service data and signaling, spectrum spreading and de-spreading, modulating and demodulating of physical channel.

HRPD modem 505

In implementation, it usually shares the same physical entity with the CDMA2000 modem. However HRPD modem is used for encoding and decoding the HRPD service data and signaling, spectrum spreading and de-spreading, modulating and demodulating the physical channel. The software module beard corresponds to the HRPD network. At a certain moment, only one of the two modems (CDMA2000 modem and the HRPD modem) is in operation.

Control Module 506

Control module controls the components' operations, such as providing a run platform for software in the application layer of the terminal, bearing the application software modules, transmitting, receiving and processing the air-interface signaling, controlling the paging process and so on. It controls every relevant module in the terminal so as to make them work cooperatively. In addition, the control module controls the switching between the CDMA2000 modem and the HRPD modem. In detail, the control module determines which modem may be enabled according to factors such as clock, network indications, user's commands and so on. If the CDMA2000 modem is enabled in cooperation with corresponding radio module, memory, display unit, keyboard, etc., the dual-mode MS/AT is considered to have accessed the CDMA2000 1x network. If the HRPD modem is enabled in cooperation with corresponding radio module, memory, display unit, keyboard, etc., the dual-mode MS/AT is considered to have accessed the HRPD network.

Memory 507

A data memory module in the terminal. It saves the data necessary to the terminal's normal operation.

Display Unit 508

In general, the display unit includes the LCD, etc. Under the control of the control module, it can display messages, icons and so on.

Keyboard 509

Keyboard is used for inputting information, transferring user's input information to the control module. With the display unit, the speaker and the microphone, etc., the function of interface between the user and the MS/AT may be achieved. In the present invention, the keyboard further includes a key "accept" which is adopted to accept the network switching indication transmitted through network and a key "reject" which is adopted to reject the network switching indication transmitted through network. In the implementation, on the premise of no confusion to the user, these two keys may be physically combined with other function keys on the keyboard of the MS/AT.

Speaker 510

Speaker is used to output voice like the cue tone, etc.

Battery module 511

Battery module provides every module with power supply.

In addition, it should have a microphone, which is not shown in the figure.

During a general call process initiated by the user, the user starts a call by sending command to control module 506 through the man-computer interface composed of the keyboard 509 and the display unit 508. Having received the instruction of the user, the control module 506 determines whether to perform network switching and start corresponding control and process module or not according to the user-indicated service type and the preset. According to the network which in operation, the control module 506 makes the CDMA2000 modem 504 or the HRPD modem 505 as the processing unit, and constructs signaling messages so as to establish the call with network. Then, the control module 506 informs the user of related information through the display unit 508 or the speaker 510. Now, the user begins the call process. Through the microphone, user's voice is sent to the CDMA2000 modem 504 or the HRPD modem 505 for encoding and modulating, and then sent to the network. At the same time, the received radio channel frame is demodulated and decoded by the CDMA2000 modem 504 or the HRPD modem 505, and then sent to the speaker. Necessary supports are offered for this process by the control module 506, the radio module 502, the memory module 507 and the battery module 511.

Figure 9:
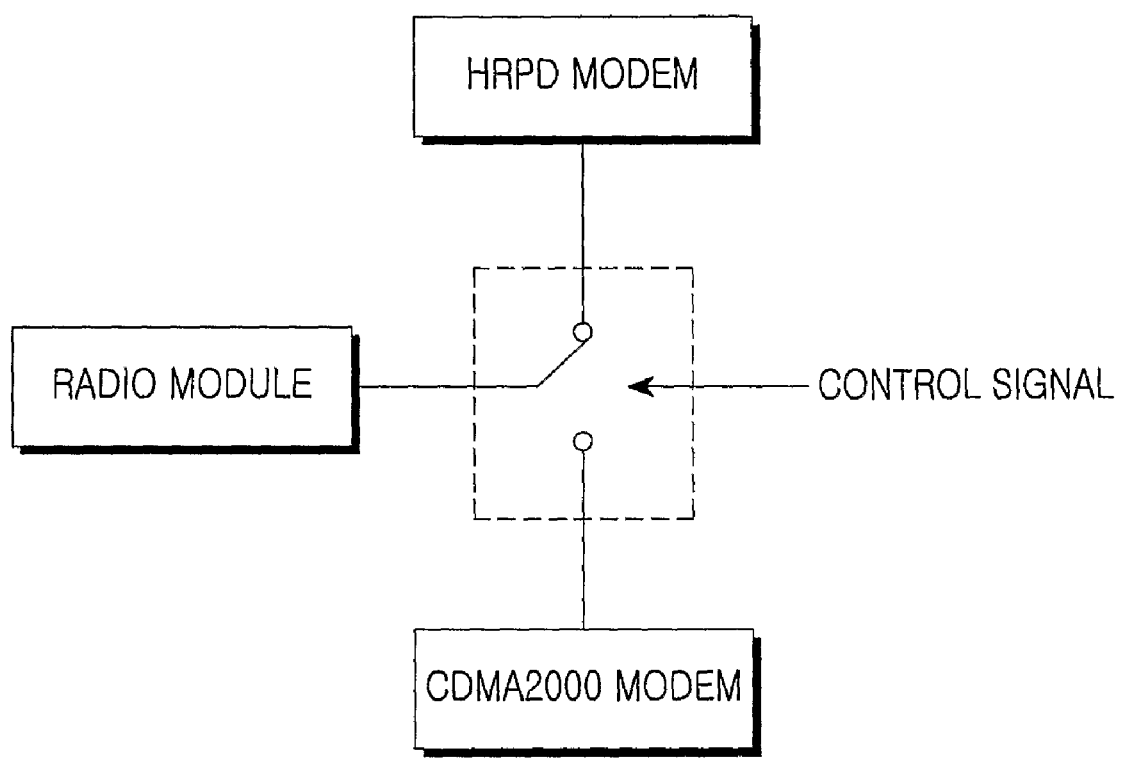
FIG. 9 illustrates a connection control between a modem and a radio module.

During the another network switching process, the network switching indication is received by the antenna of the MS/AT through the network, processed by the radio module and transferred to the modem. Having been demodulated by the modem, the indication signal is sent to the control module to be analyzed. And then the relevant information is displayed to user by the display unit. At the same time, the user is reminded to make choice by the speaker or any other man-computer interface and the user input the choice by the keyboard. If the user depresses the key "reject", the input controller keeps connection between the current modem and the radio module. If the user depresses the key "accept", the input controller breaks the connection between the current modem and the radio module by the switching module, but establishes the connection between the other modem with the radio module (As shown in FIG. 9).

Figure 8:
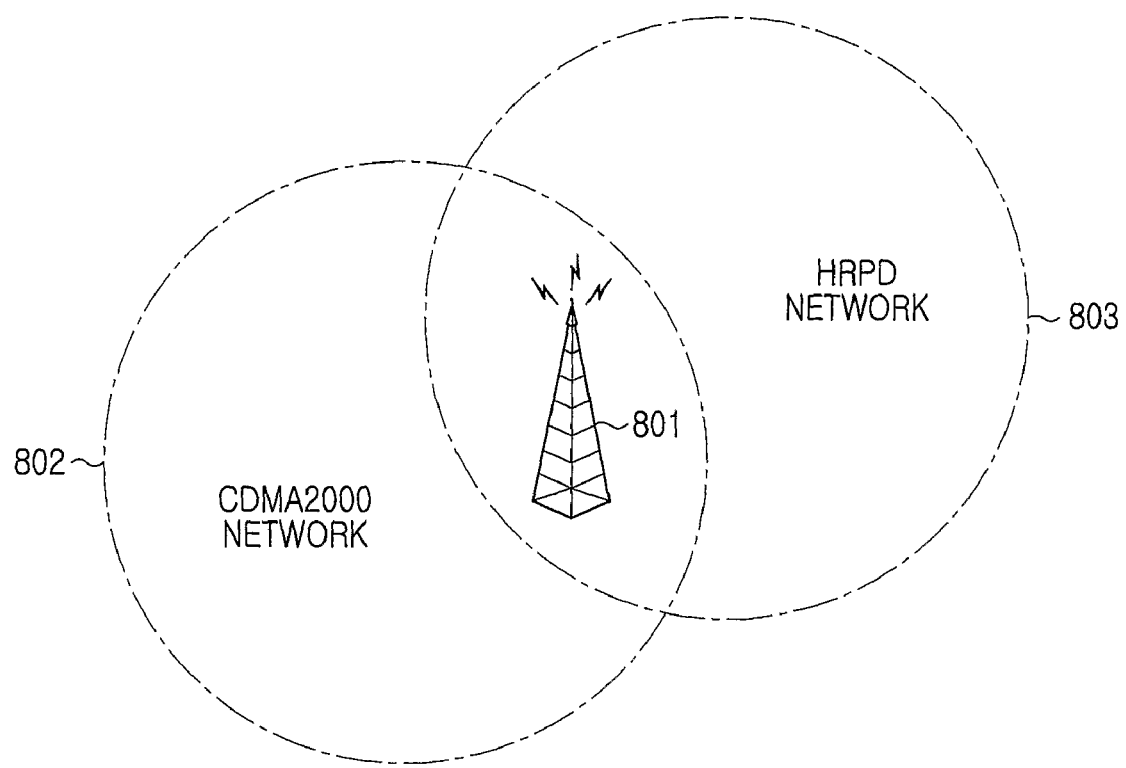
FIG. 8 schematically shows a distribution of the service area of a mobile communication system accessed by a dual-mode MS/AT according to an embodiment of present invention.

FIG. 8 schematically shows a distribution of the service area of the mobile communication system accessed by a dual-mode MS/AT according to the present invention. The dual-mode MS/AT 801 locates the coverage of the CDMA2000 network 802 and the HRPD network 803. In present invention, it is assumed that the dual-mode MS/AT 801 may perform time division multiple access to the CDMA2000 network 802 and the HRPD network 803, and accordingly may accept communication service. Specifically, the dual-mode MS/AT 801 may receive calls, short messages and other information from the network through the CDMA2000 network 802 and the HRPD network 803. In addition, it may receive calls, short messages and other information from another network through the CDMA2000 network 802 and the HRPD network 803. The user carrying the dual-mode MS/AT 801 may select a necessary one between the CDMA2000 network 802 and the HRPD network 803, and transfers a call to the selected system.

In the present invention, when a dual-mode MS/AT 801 accesses the CDMA2000 network or the HRPD and stays in either idle state or operational state, if it receives an another network's paging information through the current access network, it processes the paging information and informs user of the new call. The user may make a choice by depressing the key "accept" or "reject". In present invention, after confirming if the user has depressed the key "accept" or "reject", the dual-mode MS/AT 801 performs corresponding operations. If the user depresses the key "accept", the dual-mode MS/AT 801 exits current network and accesses the other one to respond to the call. If the user depresses the key "reject", the dual-mode MS/AT 801 stays in current network and sends a rejection message through this network or simply neglects this call.

Now, the operation of the dual-mode MS/AT for performing network switching according to network indications is described with reference to FIG. 6.

The another network switching indication mainly includes the another network paging information transferred from an another network through the interface (e.g., the previously introduced A1p interface or any other interface between networks) between the networks. In the original network, this paging information may be transmitted by a paging message added with identification information or any other message. For instance, in the CDMA2000 network, the service option unit in the general paging message may be set as a specific value to indicate that the paging originates from the HRPD network. The another paging information may be transmitted in the mode of data burst message. In the HRPD network, the another paging information may be transmitted by including it into the HRPD 3G 1X data packet. The another network switching indication may be the one that is constructed by the original network according to its status (e.g., the status of network load) so as to indicate that the original network hopes the MS/AT to switch into the other network.

Figure 6:
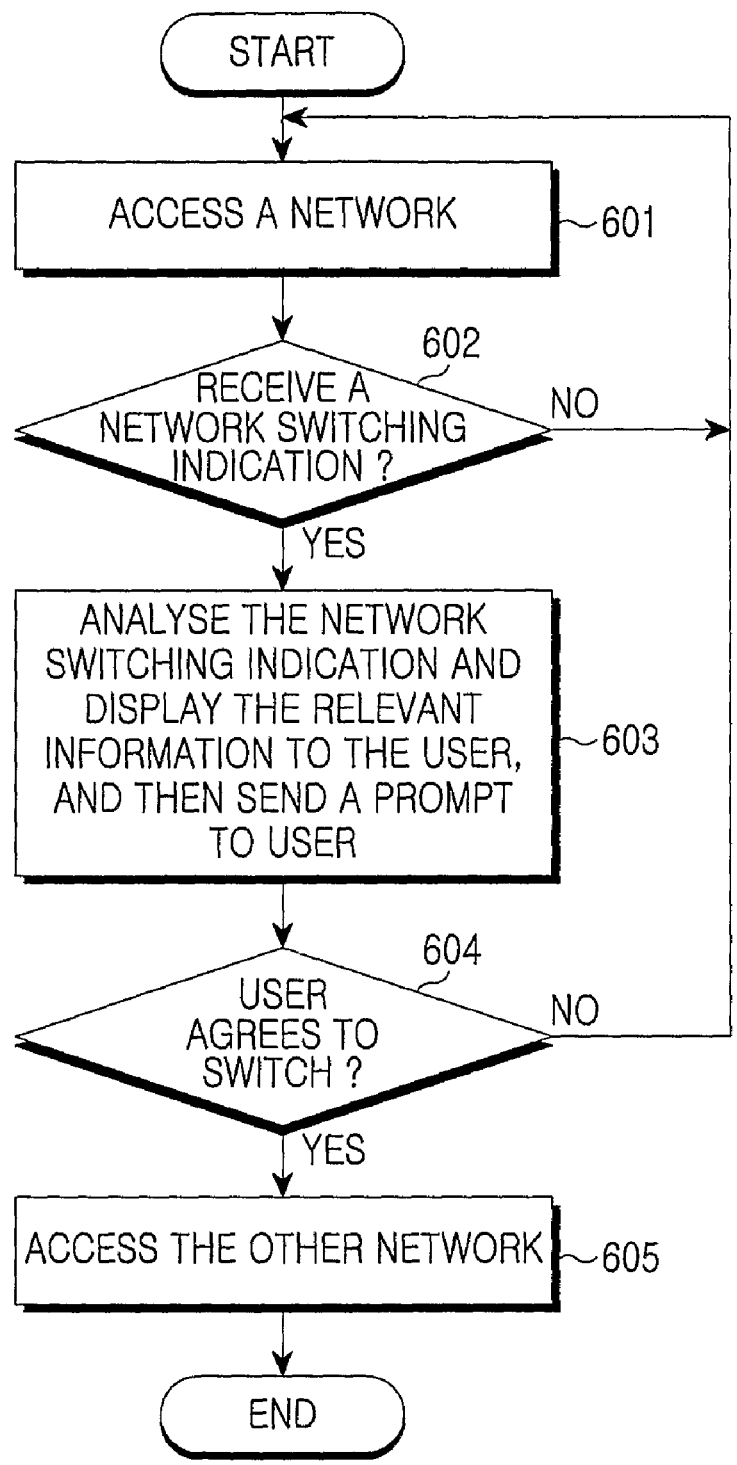
FIG. 6 illustrates an operation flow network switching according to an embodiment of present invention.
Figure 7:
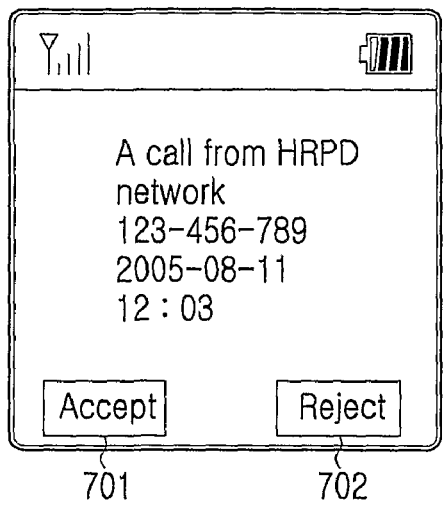
FIG. 7 schematically shows a screen and keyboard of dual-mode MS/AT when performing network switching according to an embodiment of present invention.

As shown in FIG. 6, the dual-mode MS/AT has accessed either the CDMA2000 network or the HRPD network in step 601 and stays in either operational state or idle state. In this case, the dual-mode MS/AT communicates primarily with the network where it currently locates. Occasionally, it is possible to switch into the other network for a short time because of the location refreshment, etc. In general, the dual-mode MS/AT may switch back to the original network after it completes relevant operations in the other network. The dual-mode MS/AT keeps the original state if neither network switching indication nor user instruction (which is sent by the user through the man-computer interface to ask it switch into the other network to perform some operations) is received. If the dual-mode MS/AT has received the network switching indication in step 602 through current access network, the control module 506 analyzes this indication and displays relevant information like the calling number, the service type, the calling time, etc. to the user and waits for user's choice. Then it reminds the user of related information by man-computer interface units such as the display unit 508 or the speaker 510, as shown in FIG. 3. If the user depresses the key "accept" 701 (shown in FIG. 7) in step 604 to agree to perform network switching, the control module 506 responds an ACK information to current network. Then it disables this module's control part related to current network or the modem corresponding to current network, and enables this module's control part related to the other network and the modem corresponding to the other network. Therefore, the network switching completes and the procedure goes to step 605. If the user depresses the key "reject" 702 (shown in FIG. 7) in step 604 to reject network switching, the control module 506 responds the user rejection information to current network. Then it continues to use this module's control part related to current network and the modem corresponding to current network, and the dual-mode MS/AT continues to access current network. The procedure returns step 601.

During the switching process above, for the convenience of user, the MS/AT may decide whether to switch into the other network or not according to the received another network switching indication. In this way, no user's operation step is needed. The preset may be done by the user or the manufacturer. The content of the preset can be service's priority, whether a certain service can be interrupted or not, etc.

From the descriptions above, it's seen that with the network switching method proposed in this invention and the dual-mode MS/AT adopting the method, the user may instruct the dual-mode MS/AT to switch into the other network to perform communication according to the network indication information (e.g., the another paging message through the original network).

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A device for switching between two networks according to network indications comprising:
    a control module, configured to analyze a network switching indication, received through a current access network and control a switch operation between a Code Division Multiple Access 2000 1x (CDMA2000) modem and a High Rate Packet Data (HRPD) modem;
    a keyboard, including an "accept" key, which is configured to accept the network switching indication received through the current access network and a "reject" key, which is configured to reject the network switching indication received through the current access network;

a CDMA2000 modem, configured to perform encoding and decoding of service data, encoding and decoding of signaling, spectrum spreading and de-spreading of a physical channel, and modulating and demodulating;

a HRPD modem, configured to perform encoding and decoding of service data, encoding and decoding of signaling, spectrum spreading and de-spreading of the physical channel, and modulating and demodulating;

a memory, configured to save data necessary for normal operation of a dual-mode Access Terminal (MS/AT);

a switching unit, configured to connect a radio module with the CDMA2000 modem or the HRPD modem under control of a signal from the control module; and a radio module, configured to connect with the modems through the switching unit, perform conversion between baseband digital signals and Radio Frequency (RF) analog signals and receive and transmit the RF analog signals through an antenna, wherein the MS/AT receives a 1x call arrival message from a Mobile Switching Center (MSC) and the MSC starts a timing clock while sending the 1x call arrival message to a Packet Control Function (PCF), the timing clock is divided into a first clock and a second clock, the first clock stops after the MSC receives a 1x call response message from the MS/AT through an HRPD network and the second clock stops after the MSC receives a 1x call rejection message through the HRPD network.

2. The device according to claim 1, wherein only one of the CDMA2000 modem and the HRPD modem is in operation at a moment in time.

3. The device according to claim 1, further comprising a display unit, configured to display messages including icons under the control of the control module.

4. The device according to claim 1, wherein the "accept" key and the "reject" key are combined with other function keys on the keyboard of the MS/AT.

5. A method for switching between two networks according to network indications comprising steps of:

after receiving a network switching indication through a current access network, a control module of a dual mode Access Terminal (MS/AT) analyzes the indication and displays relevant information to a user to control a switch operation between a Code Division Multiple Access 2000 1x (CDMA2000) modem and a High Rate Packet Data (HRPD) modem;

if the user depresses an "accept" key, the control module disables the control module's control part related to the current network and a modem corresponding to the current network; and if the user depresses a "reject" key, the control module disables the control module's control part related to the second network and a modem corresponding to the second network and the dual-mode MS/AT continues to use the control module's control part related to the current network and the modem corresponding to the current network, wherein the MS/AT receives a 1x call arrival message from a Mobile Switching Center (MSC) and the MSC starts a timing clock while sending the 1x call arrival message to a Packet Control Function (PCF), the timing clock is divided into a first clock and a second clock, the first clock stops after the MSC receives a 1x call response message from the MS/AT through an HRPD network and the second clock stops after the MSC receives a 1x call rejection message through the HRPD network.

6. The method according to claim 5, wherein the network switching indication received by the dual-mode MS/AT through a current access network is a paging information transferred from the second network through an interface between the two networks.

7. The method according to claim 6, wherein in a CDMA2000 network, a service option unit in second network's paging information transmitted through the current access network is set as a specific value to indicate that the paging is either a general paging message from the HRPD network or a burst data including paging information of the second network.

8. The method according to claim 6, wherein in the HRPD network, second network's paging information transmitted through the current access network is a 3G1x data packet including a paging message of a 1x network.

9. The method according to claim 6, wherein the dual-mode MS/AT decides whether to switch into the second network or not according to a preset after receiving the network switching indication.

10. The method according to claim 6, wherein the relevant information includes a calling number and a calling time.

11. The method according to claim 5, wherein the network switching indication received by the dual-mode MS/AT through the current access network is an indication that an original network is requesting the MS/AT to switch into the second network according to the original network's state.

12. The method according to claim 5, wherein an interface between the two networks is an interface between second network elements including an A1p interface.

* * * * *